United States Patent
Mueller et al.

(10) Patent No.: US 8,393,997 B2
(45) Date of Patent: Mar. 12, 2013

(54) METHOD FOR CONTROLLING THE FUNCTIONING OF A TWIN INTERNAL COMBUSTION ENGINE IN A VEHICLE, ESPECIALLY A FIRE-FIGHTING VEHICLE

(75) Inventors: Hubert Mueller, Camignone (IT); Claudio Catalano, Milan (IT); Andrea Zanolini, Cogne (IT)

(73) Assignee: IVECO S.p.A., Turin (IT)

( * ) Notice: Subject to any disclaimer, the term of this patent is extended or adjusted under 35 U.S.C. 154(b) by 141 days.

(21) Appl. No.: 13/110,126

(22) Filed: May 18, 2011

(65) Prior Publication Data

US 2011/0287893 A1  Nov. 24, 2011

(30) Foreign Application Priority Data

May 18, 2010  (EP) ..................................... 10425162

(51) Int. Cl.
*B60K 5/08* (2006.01)
(52) U.S. Cl. ........................................................... 477/6
(58) Field of Classification Search ................... 477/2, 6
See application file for complete search history.

(56) References Cited

U.S. PATENT DOCUMENTS

| | | | |
|---|---|---|---|
| 6,852,062 B1 * | 2/2005 | Ahner et al. | 477/2 |
| 2004/0138023 A1 * | 7/2004 | Moore et al. | 477/2 |

FOREIGN PATENT DOCUMENTS

| | | |
|---|---|---|
| DE | 3249000 | 2/1987 |
| GB | 392282 | 5/1933 |
| GB | 547894 | 9/1942 |
| JP | 61016135 | 1/1986 |

\* cited by examiner

*Primary Examiner* — Dirk Wright
(74) *Attorney, Agent, or Firm* — Stetina Brunda Garred & Brucker

(57) ABSTRACT

Method for controlling the functioning of two heat engines connected to a torque distributor (5) in a fire-fighting vehicle, each engine being provided with automatic transmission and with a first clutch (K1) connecting the first (A) of said engines to a delivery pump of a liquid; with a second clutch (K2) connecting the first engine (A) to the vehicle's traction; with a third clutch (K3) connecting the second engine (B) to the vehicle's traction. The control has an activation or a deactivation step of said delivery pump, by closing or opening said first clutch (K1) at a vehicle speed lower than a threshold higher than zero, and in a condition of decelerating vehicle, with the simultaneous opening or closing of said second clutch (K2), and if said conditions are verified within an interval of time from an activation or deactivation request.

8 Claims, 6 Drawing Sheets

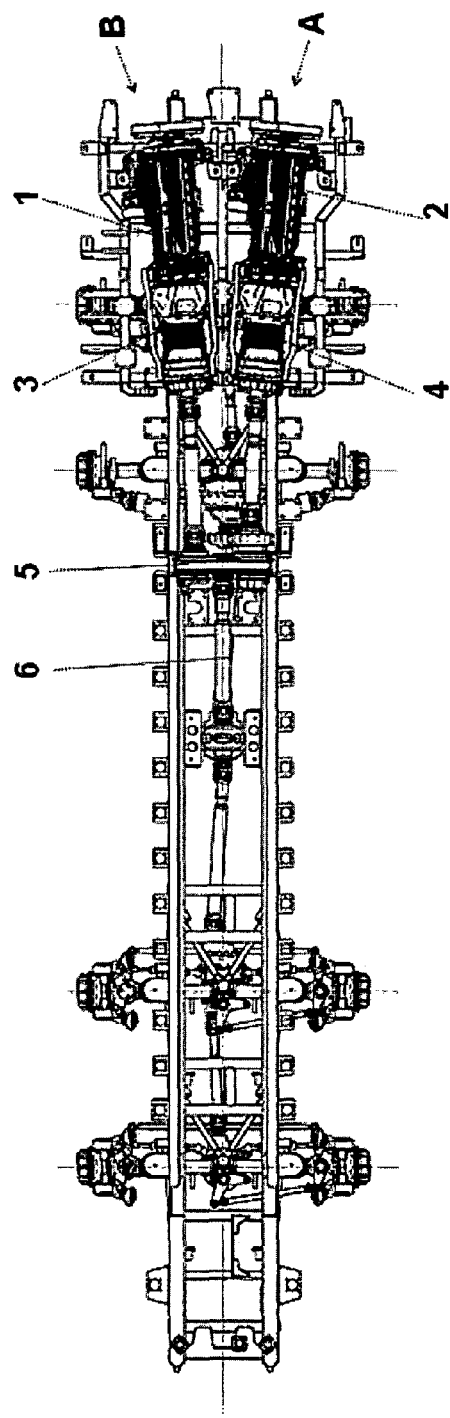
FIG. 1.1
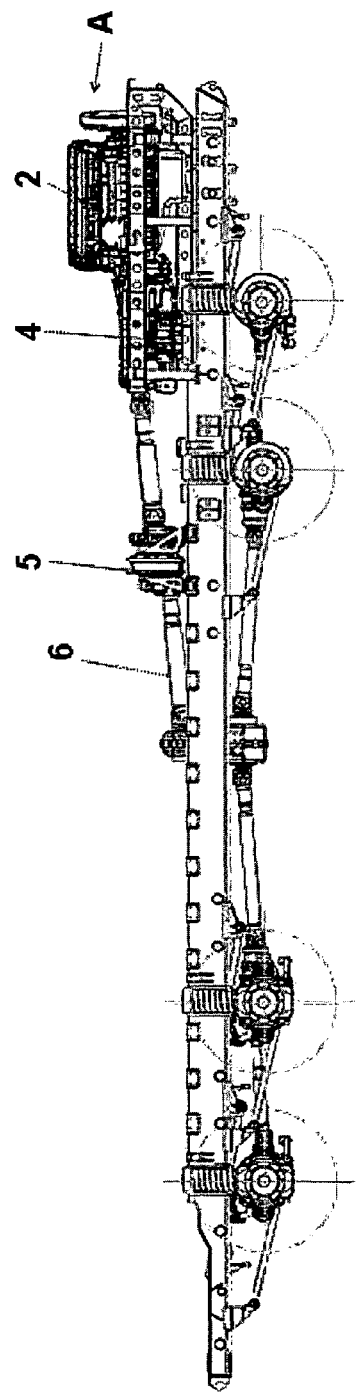
FIG. 1.2

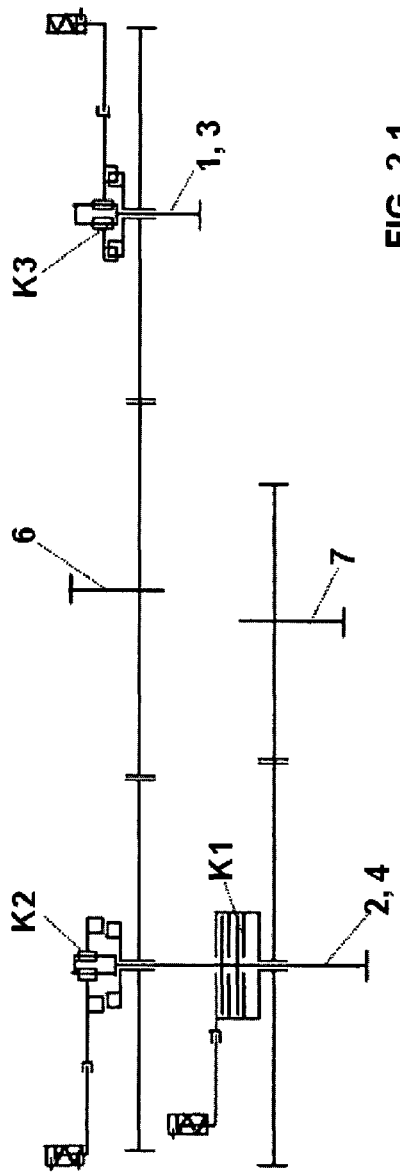
FIG. 2.1
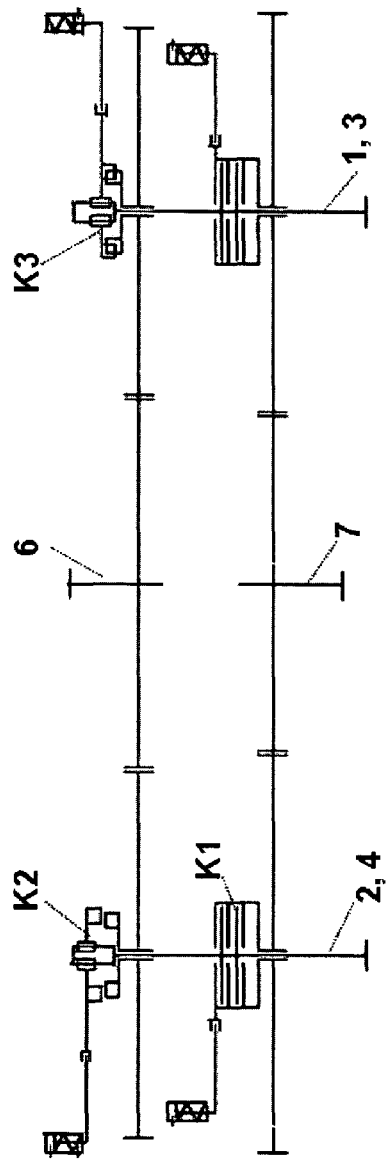
FIG. 2.2

METHOD FOR CONTROLLING THE FUNCTIONING OF A TWIN INTERNAL COMBUSTION ENGINE IN A VEHICLE, ESPECIALLY A FIRE-FIGHTING VEHICLE

CROSS-REFERENCE TO RELATED APPLICATIONS

Not Applicable

STATEMENT RE: FEDERALLY SPONSORED RESEARCH/DEVELOPMENT

Not Applicable

APPLICATION FIELD OF THE INVENTION

The present invention refers to a method for controlling the functioning of a twin internal combustion engine in a vehicle, especially a fire-fighting vehicle.

DESCRIPTION OF THE PRIOR ART

Vehicles, especially fire-fighting vehicles, comprising a pair of internal combustion engines connected in parallel are known. They are vehicle having big dimensions, whose gross weight may be about 50 tons or more, that are used in special fields or situations, such as for example in airports, where a fast intervention is necessary, carrying people and a high quantity of fire extinguishing material.

One single engine would not be enough to obtain the necessary pickup torque, above all because at present single engines having enough power for these needs are not available, also because they have to comply with the current emission standards (Euro 4/5).

Therefore both engines contribute to the vehicle's traction in order to be faster in reaching the intervention place, after that one of the two engines is used as a pump to sprinkle the fire extinguishing liquid on the intervention place itself.

The methods known for controlling the functioning of the two engines still have margins of improvement, regarding the optimization of the ratio between engine performance and intervention time, as a function also of the weight and of the dimensions of the vehicle. The desired improvements also relate to the management/control of the two engines functioning as a traction engine or as a pumping engine.

SUMMARY OF THE INVENTION

Therefore the aim of the present invention is to provide a method for controlling the functioning of a twin internal combustion engine in a vehicle, especially a fire-fighting vehicle, suitable for minimizing the intervention time of the vehicle itself.

The object of the present invention is a method for controlling the functioning of a twin internal combustion engine in a vehicle, especially a fire-fighting vehicle, each engine being equipped with automatic transmission, suitable to transfer the torque generated at a torque distributor, comprising: a first clutch suitable to connect a first engine unit of said twin internal combustion engine to a delivery pump of the liquid; a second clutch suitable to connect said first engine unit to the traction system of the vehicle; a third clutch suitable to connect a second engine unit of said twin internal combustion engine to the traction system of the vehicle, characterized in that said control has an activation step and a deactivation step of said delivery pump of the liquid, by means of the opening or of the closing of said first clutch with a vehicle speed lower than a threshold higher than zero, and in a condition of decelerating vehicle, with the simultaneous opening or closing of said second clutch, if said conditions occur within a certain interval of time from an activation or a deactivation request.

A particular object of the present invention is a method for controlling the functioning of a twin internal combustion engine in a vehicle, especially a fire-fighting vehicle, as described more fully in the claims, which are an integral part of this description.

BRIEF DESCRIPTION OF THE DRAWINGS

Further purposes and advantages of the present invention will become clear from the following detailed description of a preferred embodiment (and its alternative embodiments) and the drawings that are attached hereto, which are merely illustrative and non-limitative, in which:

FIGS. 1.1 and 1.2 show respectively a top and a lateral view of a vehicle frame equipped with a double engine;

FIGS. 2.1 and 2.2 show examples of two alternative structure schemes of the torque distributor block which distributes the torque generated by the two engines;

Figure 3:
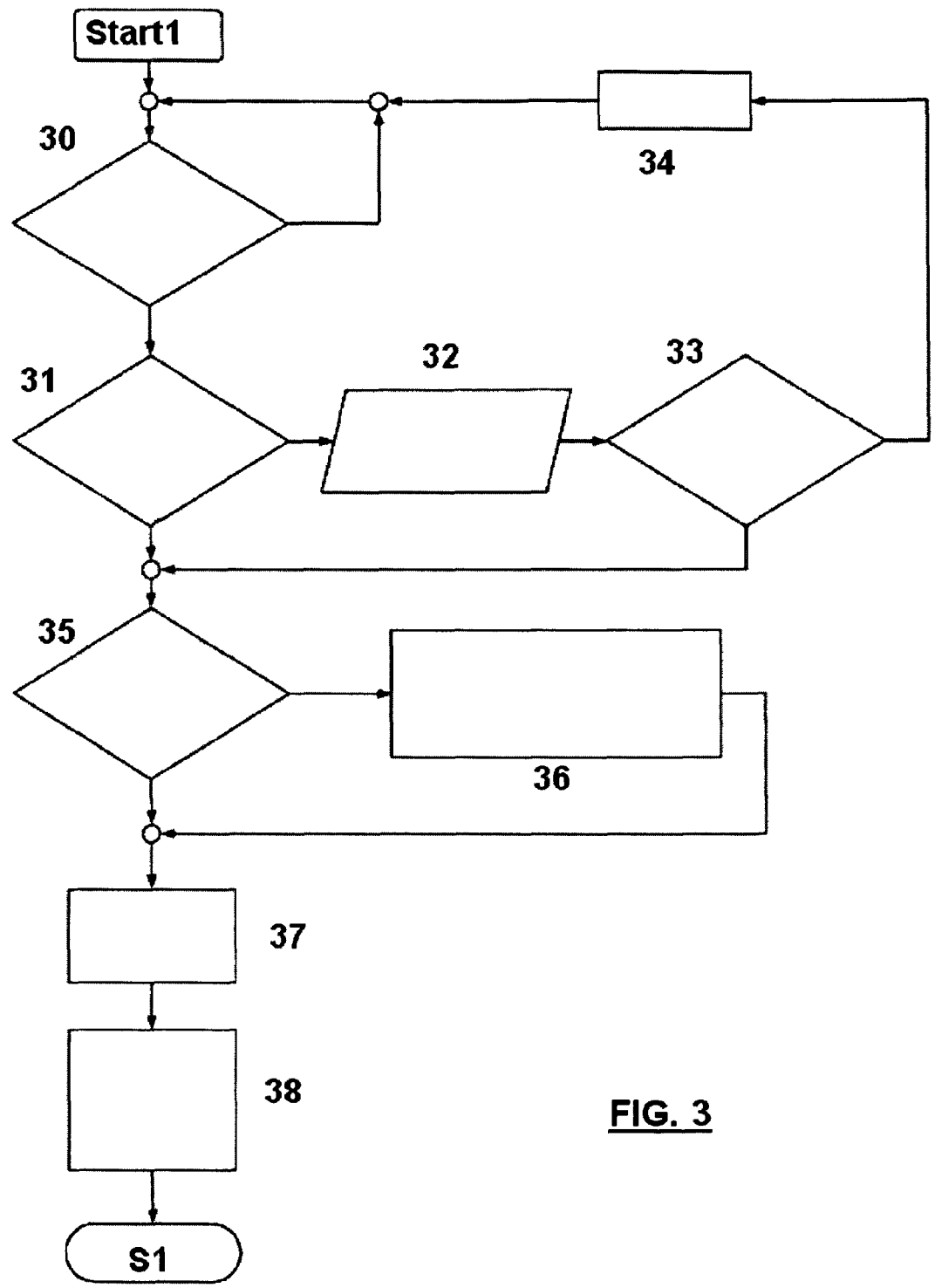

FIGS. from 3 to 6 show flowcharts illustrating the control method according to the present invention.

In the drawings the same reference numbers and letters identify the same elements or components.

DETAILED DESCRIPTION

FIGS. 1.1 and 1.2 show a vehicle suitable to realize the method according to the present invention comprising two adjacent engine units A, B respectively comprising engines 1 and 2, each one of them being provided with its own transmission units 3, 4, comprising an automatic transmission, preferably equipped with torque converter, which transfers the generated torque to a block 5, substantially of a type known in the art, which functions as a torque distributor (torque summation box).

The latter, according to the control signals received from an electronic control unit not shown in the figures, can work according to one of two operating modes:

- in a first operating mode the torque distributor 5 sums up the torque contributions deriving from the two engines and transfers the resulting torque to the propeller shaft 6 which in turn transfers it to the driving axles of the vehicle: in the example shown, the vehicle is equipped with four driving axles, but obviously other configurations are also possible;
- in a second operating mode the torque distributor 5 disconnects the traction of one of the two engines, for example the engine unit A in the figures, and connects the engine to a pump not shown in the figures, so that the engine functions as a pumping engine for delivering a liquid, for example a fire-fighting liquid; while the other engine unit B is used for the usual traction of the vehicle.

The circuit block diagram of the torque distributor is shown in two possible alternative embodiments in FIGS. 2.1 and 2.2.

In a first alternative embodiment (FIG. 2.1) the torque distributor essentially comprises a first clutch K1 suitable to connect the propeller shaft of the first engine unit A (2, 4) to the shaft 7 of the delivery pump of the liquid, and a second clutch K2 suitable to connect the propeller shaft of the first engine unit A (2, 4) to the propeller shaft 6 transmitting the traction torque of the vehicle. In addition a third clutch K3 is present suitable to connect the propeller shaft of the second engine unit B (1, 3) to the propeller shaft 6 transmitting the traction torque of the vehicle. In this first alternative embodiment only one of the two engines (the engine unit A) may function as a pumping engine.

In a second alternative embodiment (FIG. 2.2) also the engine unit B may function as a pumping engine. Then the torque distributor comprises, in addition to the elements of the first alternative embodiment, a fourth clutch K4 suitable to connect the propeller shaft of the second engine unit B (1, 3) to the shaft 7 of the delivery pump of the liquid. In this second alternative embodiment both engines may function as pumping engines, guaranteeing a higher security functioning: if a failure occurs to one engine unit, the other engine unit may replace it. In general the two engine units may alternatively control the pump.

The method for controlling the functioning of the twin internal combustion engine according to the invention is actuated by controlling the functioning of the torque distributor, which determines the passage between said first and said second operating mode.

A relevant aspect of the method according to the invention is the fact that it controls the activation and also the deactivation of the pump of the fire-fighting liquid also when the vehicle is still moving, so that the operations are sped up. The vehicle speed, however, should be lower than a safety threshold, and the vehicle has to be decelerating.

Figure 4:
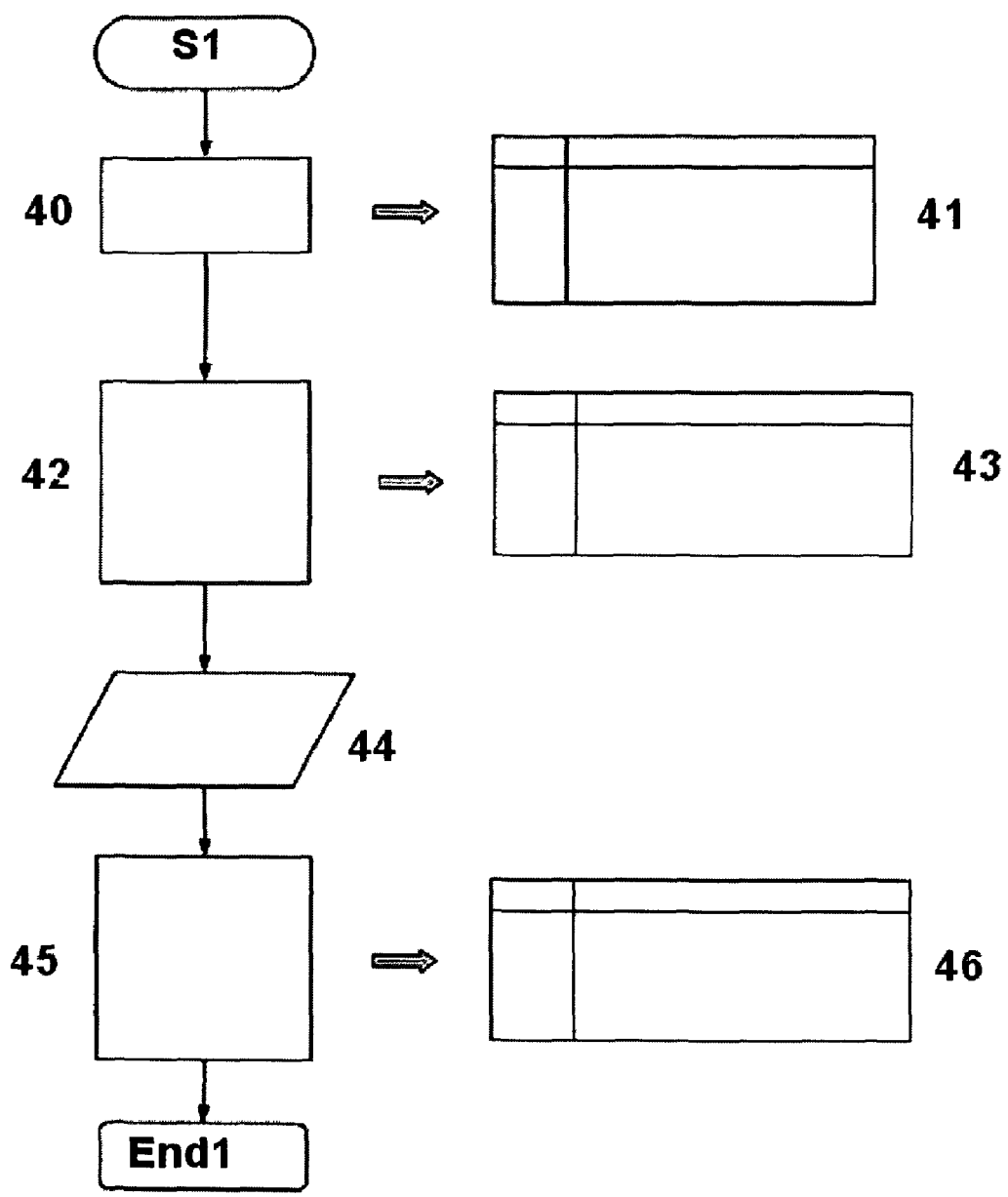
Figure 5:
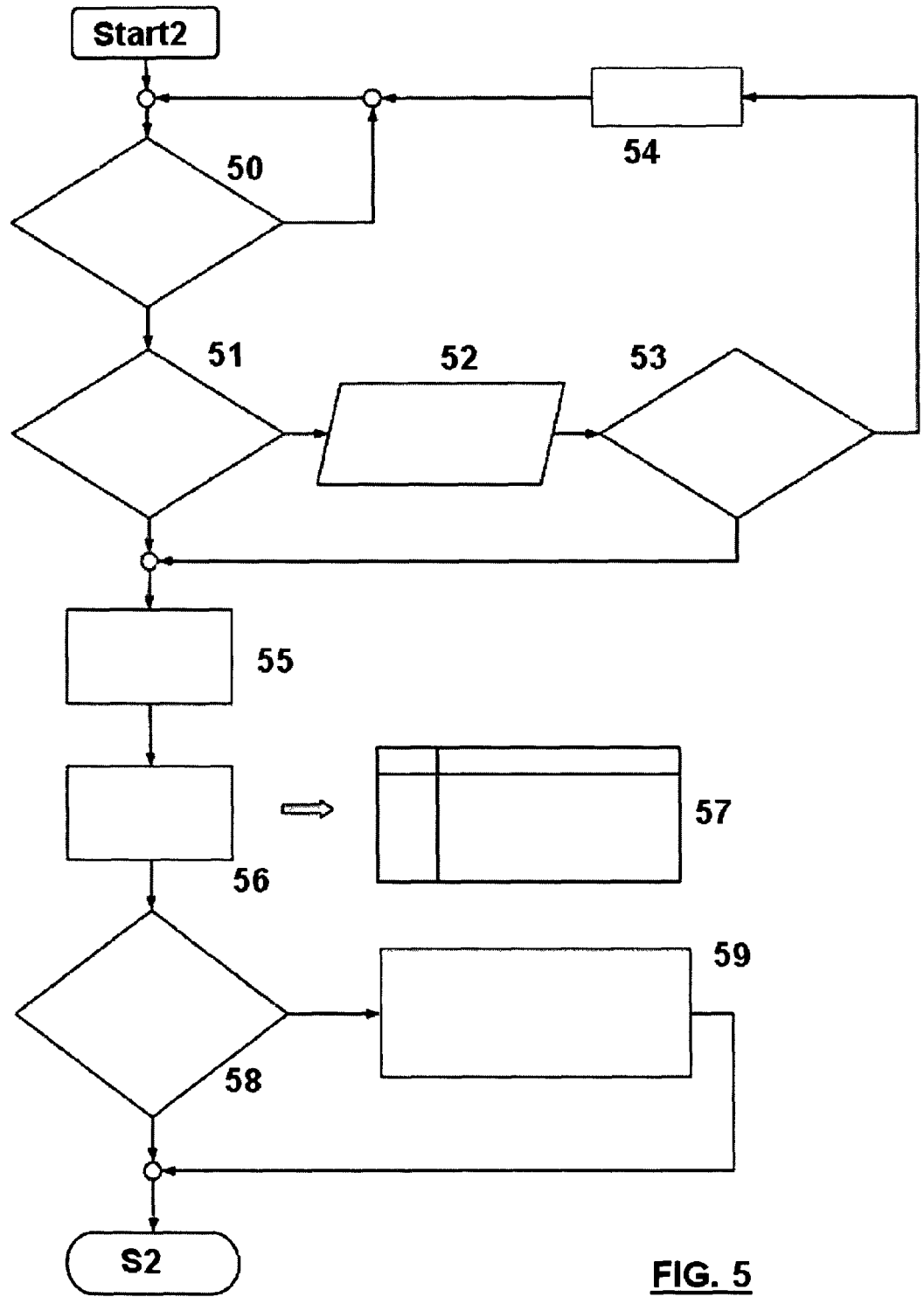
Figure 6:
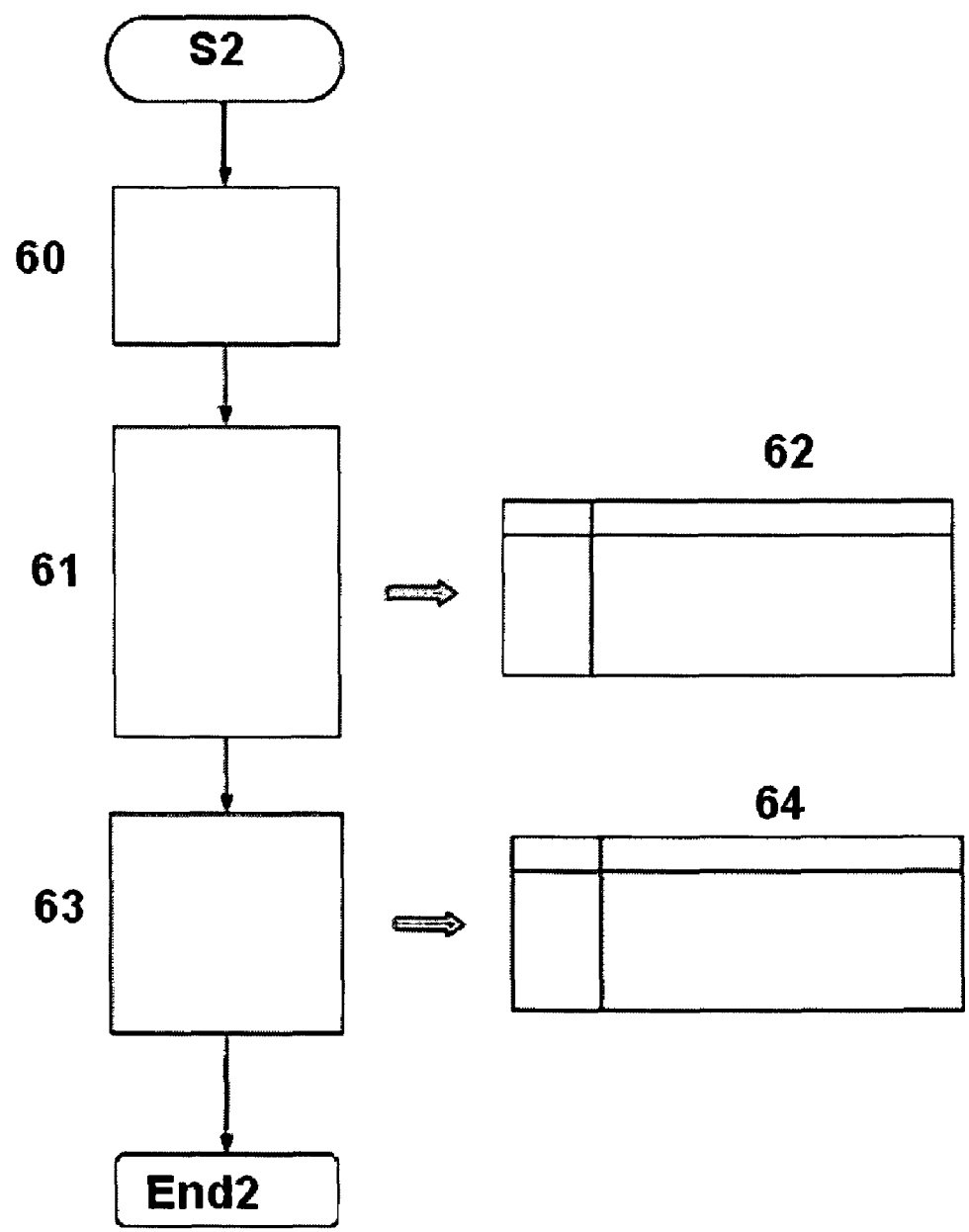

With reference to the flowcharts of the FIGS. 3 and 4, in the starting condition (START1) the vehicle is moved by both engines, then there is the condition in which both clutches K2 and K3 are closed, while the clutch K1 is open, in the torque distributor.

The activation or the deactivation of the pump of the fire-fighting liquid is controlled by the operator, for example by pressing a button on the dashboard.

Some preliminary controls are actuated, suitable to verify the correctness of the procedure.

If the button is held pressed for longer than a threshold (e.g. 0.5 s) (block 30), the procedure is activated verifying if the accelerator pedal is released (decelerating vehicle) and if the speed V of the vehicle is lower than a threshold, e.g. V<60 km/h (block 31). It is not required that the vehicle is stationary. If the two conditions are not verified, acoustic or visual signals (notices, or blinkers) are activated (block 32), indicating that the current conditions prevent the starting of the procedure.

After that the procedure verifies if these conditions of released accelerator and vehicle speed lower than the threshold occur within an interval of time, e.g. within 10 s from the first pressure on the button. If these conditions are verified, further controls are activated, otherwise the visual or acoustic signals (block 34) are turned off and the procedure goes back to START1.

If it is possible to proceed, the procedure verifies if the engine brake or the retarder (if present) are deactivated with respect to the engine unit which should stop controlling the vehicle's traction and start controlling the pump (block 35), for example the engine A: if they are not, they are deactivated in this moment: this is necessary in order to decrease the negative load of the engine A during the opening of the clutch K2.

Moreover the corresponding engine brake and retarder functions are increased on the other engine B, in order to compensate the loss of these functions on one of the two engines (block 36).

If the engine brake or the retarder of the engine A are deactivated, the automatic transmission of the engine A shifts to neutral (block 37): this physically corresponds to a shift from "D" (drive) to "N" (neutral).

Moreover (block 38) the clutch K2 is opened and the rpm of the engine A are brought to a low idle speed rate (e.g. 800 rpm), which is typical of when it starts functioning as a pump.

The clutch K1 (block 40) is closed. In this condition the engine A is activated (block 41) according to a different control curve, based on the control of the rpm and not of the delivered torque.

The automatic transmission of the engine A is shifted from "N" to "D" in "pumping" mode (block 42), namely in a constant gearbox ratio condition, e.g. fourth or fifth gear. A signal enabling the whole vehicle control system is generated (block 43) when the engine A starts functioning as a pump, which therefore starts to be operated with a control. In general, a message is shown to the driver when the engine A functions as a pumping engine (block 44).

The control of the rpm of the engine A is performed (block 45) by means of appropriate manoeuvres by the operator as a function of the desired delivery pressure of the pump, and consequently a determined rpm is required to the engine A (block 46) by the system which controls the functioning as fire-fighting system. This happens during all the time that is necessary to the intervention.

Therefore it should be noted that during these steps the vehicle does not have to be stationary, but just decelerating, at a speed lower than a threshold.

When the fire-fighting operations end, the operator (START2) presses again the button on the dashboard and holds it pressed, and the same controls and operations of the blocks 30-34 are performed in the corresponding blocks 50-54.

After that the rpm of the engine A are brought to a constant low idle speed rate (block 55), and the clutch K1 is opened (block 56). In this condition the engine A goes back to the control of the torque curve (block 57).

The clutch K2 is still open. Before closing it, the system performs some operations. First it controls the rpm of the two engines (block 58), so that their difference is lower than a certain threshold (e.g. 50 rpm), in order to avoid jerks. For this purpose the rpm of the drive shaft of the engine A (block 59) is controlled so that it can be brought to a value near to the one of the engine B, lower than the threshold. The gear of the automatic transmission of the engine A is still the one engaged during the functioning as a pump, and therefore it may be different from the one of the engine B.

The automatic transmission of the engine A is shifted from "D" to "N" in order to close the clutch K2 (block 60). Then it is shifted back to "D" and the gear is shifted to the same value as the engine B (block 61). Thus the clutch K2 is gradually closed even though the vehicle is moving. A signal indicating that the engine A provides for the vehicle's traction is generated (block 62).

The angular speed of the shafts of the two engines is now the same (block 63), and both engines are controlled by the accelerator pedal (block 64).

Thus the vehicle is moved by the two engines in a normal travelling condition (END2).

In the case of the second alternative embodiment (FIG. 2.2) wherein also the second engine unit B may function as a pumping engine, an additional control function will be present, suitable to determine which one of the two engines should function as a pump, and consequently which one of the two pairs of clutches, K1, K2 or K3, K4 should be operated according to what is described above. In this case in the engine which always provides for the vehicle's traction, the relative clutch K1 o K4 will always be open.

The present invention may advantageously be realized by means of a computer program, which comprises program code means performing one or more steps of said method, when said program is run on a computer. For this reason the scope of the present patent is meant to cover also said computer program and the computer-readable means that comprises a recorded message, such computer-readable means comprising the program code means for performing one or more steps of such method, when such program is run on a computer.

It will be apparent to the person skilled in the art that other alternative and equivalent embodiments of the invention can be conceived and reduced to practice without departing from the scope of the invention.

From the description set forth above it will be possible for the person skilled in the art to embody the invention with no need of describing further construction details.

What is claimed is:

1. Method for controlling the functioning of a twin internal combustion engine in a vehicle, especially a fire-fighting vehicle, each engine being equipped with automatic transmission, suitable to transfer the torque generated at a torque distributor, comprising:
   a first clutch suitable to connect a first engine unit of said twin internal combustion engine to a delivery pump of a liquid;
   a second clutch suitable to connect said first engine unit to a traction system of the vehicle;
   a third clutch suitable to connect a second engine unit of said twin internal combustion engine to a traction system of the vehicle,
   wherein said control has an activation step or a deactivation step of said delivery pump of a liquid, by closing or opening said first clutch at a vehicle speed lower than a threshold higher than zero, and in a condition of decelerating vehicle, with the simultaneous opening or closing of said second clutch, and if said conditions are verified within an interval of time from an activation or a deactivation request.

2. Method according to claim 1, wherein said condition of decelerating vehicle is verified if the accelerator pedal is released.

3. Method according to claim 1, comprising a deactivation step of an engine brake or of a retarder of said first engine unit, and the increase of the corresponding engine brake and retarder of said second engine unit.

4. Method according to claim 1, comprising the further activation steps of said delivery pump occurring in sequence:
   shift the automatic transmission of said first engine unit to neutral;
   open said second clutch, and bring the rpm of said first engine unit to a constant low idle speed;
   close said first clutch;
   shift the automatic transmission of said first engine unit to a constant gear;
   control the rpm of said first engine unit to determine the functioning of said delivery pump.

5. Method according to claim 4, comprising the further activation steps of said delivery pump occurring in sequence:
   bring the rpm of said first engine unit to a constant low idle speed, and open said first clutch;
   control the rpm of said first and of said second engine unit so that the difference is lower than a certain threshold;
   shift said automatic transmission of said first engine unit to neutral;
   close said second clutch;
   shift said automatic transmission back to neutral;
   shift said automatic transmission of said first engine unit to the same value as the one of said second engine unit.

6. Method according to claim 1, wherein said control operates so that:
   in said activation step, the torque distributor disconnects the clutch of said first engine unit and connects it to said pump, said second engine unit staying normally connected to the traction system of the vehicle;
   deactivation step the torque distributor sums up the torque contributions from said first and second engine unit and transfers the resulting torque to said traction system of said vehicle.

7. Computer program comprising program code means suitable for performing the steps of claim 1, when such program is run on a computer.

8. Computer-readable means comprising a recorded program, said computer-readable means comprising program code means suitable for performing the steps according to the claim 1, when said program is run on a computer.

* * * * *